US009232429B2

(12) United States Patent
Zhang et al.

(10) Patent No.: US 9,232,429 B2
(45) Date of Patent: *Jan. 5, 2016

(54) COMPRESSED FEEDBACK FORMAT FOR WLAN

(71) Applicant: Marvell World Trade Ltd., St. Michael (BB)

(72) Inventors: Hongyuan Zhang, Fremont, CA (US); Sudhir Srinivasa, Sunnyvale, CA (US); Hyukjoon Kwon, San Diego, CA (US); Raja Banerjea, Sunnyvale, CA (US)

(73) Assignee: MARVELL WORLD TRADE LTD., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 14/281,555

(22) Filed: May 19, 2014

(65) Prior Publication Data

US 2014/0254414 A1  Sep. 11, 2014

Related U.S. Application Data

(63) Continuation of application No. 13/252,710, filed on Oct. 4, 2011, now Pat. No. 8,731,090.

(60) Provisional application No. 61/389,635, filed on Oct. 4, 2010.

(51) Int. Cl.
*H04B 7/02* (2006.01)
*H04W 24/10* (2009.01)
(Continued)

(52) U.S. Cl.
CPC ............. *H04W 24/10* (2013.01); *H04L 1/0693* (2013.01); *H04L 5/0023* (2013.01);
(Continued)

(58) Field of Classification Search
CPC ................................ H04L 1/0618; H04L 1/06
USPC .......................................................... 375/267
See application file for complete search history.

(56) References Cited

U.S. PATENT DOCUMENTS 7,599,332 B2   10/2009   Zelst et al.
7,742,390 B2    6/2010   Mujtaba
(Continued)

FOREIGN PATENT DOCUMENTS

EP        1 816 772 A1     8/2007
WO   WO-2006/059566 A1    6/2006

OTHER PUBLICATIONS

International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, (1999).

(Continued)

*Primary Examiner* — Santiago Garcia

(57) ABSTRACT

Channel data for a plurality of OFDM tones for one or more spatial or space-time streams are determined. A plurality of angle values associated with the one or more spatial or space-time streams and the one or more OFDM tones of the plurality of OFDM tones are determined. For each of the one or more spatial or space time streams, a per-tone signal to noise ratio (PT-SNR) associated with one or more OFDM tone of the plurality of OFDM tones is determined, and an average signal to noise ratio (avg-SNR) is determined by averaging signal to noise ratio (SNR) values corresponding to one or more OFDM tones of the plurality of OFDM tones. A feedback report is generated to include at least i) the plurality of angle values, ii) the PT-SNRs, and iii) the avg-SNR.

22 Claims, 5 Drawing Sheets

(51) Int. Cl.
    *H04L 5/00*        (2006.01)
    *H04L 25/02*      (2006.01)
    *H04L 25/03*      (2006.01)
    *H04L 1/06*        (2006.01)

(52) U.S. Cl.
CPC ........... *H04L 5/0053* (2013.01); *H04L 5/0057* (2013.01); *H04L 25/0204* (2013.01); *H04L 25/03343* (2013.01); *H04L 1/06* (2013.01); *H04L 1/0618* (2013.01); *H04L 2025/03414* (2013.01); *H04L 2025/03426* (2013.01); *H04L 2025/03808* (2013.01)

(56) References Cited

U.S. PATENT DOCUMENTS

| | | | |
|---|---|---|---|
| 8,144,647 B2 | 3/2012 | Nabar et al. | |
| 8,155,138 B2 | 4/2012 | van Nee | |
| 8,289,869 B2 | 10/2012 | Sawai | |
| 8,526,351 B2 | 9/2013 | Fischer et al. | |
| 8,619,907 B2 | 12/2013 | Mujtaba et al. | |
| 8,724,720 B2 | 5/2014 | Srinivasa et al. | |
| 8,731,090 B2 | 5/2014 | Zhang et al. | |
| 2008/0069261 A1* | 3/2008 | Prasad et al. | 375/267 |
| 2009/0022128 A1 | 1/2009 | Nabar et al. | |
| 2009/0196163 A1 | 8/2009 | Du | |
| 2009/0225721 A1* | 9/2009 | Cudak et al. | 370/330 |
| 2010/0067401 A1* | 3/2010 | Medvedev et al. | 370/253 |
| 2010/0226452 A1* | 9/2010 | Chakraborty et al. | 375/260 |
| 2010/0296407 A1* | 11/2010 | Medvedev et al. | 370/252 |
| 2011/0002219 A1 | 1/2011 | Kim et al. | |
| 2011/0159866 A1* | 6/2011 | Kim et al. | 455/422.1 |
| 2011/0310827 A1 | 12/2011 | Srinivasa et al. | |
| 2012/0033592 A1* | 2/2012 | Kim et al. | 370/310 |
| 2012/0039196 A1 | 2/2012 | Zhang | |
| 2012/0039406 A1 | 2/2012 | Srinivasa et al. | |
| 2012/0202548 A1* | 8/2012 | Lee et al. | 455/513 |

OTHER PUBLICATIONS

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.* (Jun. 12, 2007).

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.* (1999).

IEEE Std 802.11a-1999 (R2003) (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.* (1999), (Reaffirmed Jun. 12, 2003).

IEEE Std 802.11b-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.* (Nov. 7, 2001).

IEEE Std 802.11b-1999 (Supplement to ANSI/IEEE Std 802.11, 1999 Edition) "Supplement to IEEE Standard for Information technology—Telecommunications and information exchange between systems—Local and metropolitan area networks—Specific requirements Part 11: Wireless LAN Medium Access Control (MAC) and Physical Layer (PHY) specifications: Higher-speed Physical Layer Extension in the 2.4 GHZ Band," *The Institute of Electrical and Electronics Engineers, Inc.* (1999).

IEEE Std 802.11g/D2.8, May 2002 (Supplement to ANSI/IEEE Std 802.11, 1999 Edition) "Draft Supplement to Standard [for] Information technology—Telecommunications and information exchange between systems—Local and metropolitan area networks—Specific requirements—Part 11: Wireless LAN Medium Access Control (MAC) and Physical Layer (PHY) specifications: Further Higher-Speed Physical Layer Extension in the 2.4 GHz Band," *The Institute of Electrical and Electronics Engineers, Inc.* (May 2002).

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.* (Apr. 2003).

IEEE P802.11nTM/D3.00, "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.* (Sep. 2007).

IEEE Std. 802.11nTM IEEE "Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.* (Oct. 2009).

"Unapproved Draft Standard for Information Technology—Telecommunications and information exchange between systems—Local and metropolitan area network—Specific requirements Part 11: Wireless LAN Medium Access Control (MAC) and Physical Layer (PHY) specifications. (This document reflects the combining of the 2003 Edition of 802.11 plus the 802.11 g, 802.11 h, 802.11 i and 802.11j Amendments) (Revision of IEEE Std 802.11-1999) (Superseded by P802.11-REVma_D7.0)," IEEE Std P802.11-REVma/06.0, vol., No., (2006).

Chen, "Home Network Basis: Transmission Environments and Wired/Wireless Protocols," Prentice Hall (Jul. 2003).

Gunnam, et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).

Hiertz, et al., "The IEEE 802.11 Universe," IEEE Communications Magazine, pp. 62-70, Jan. 2010.

Love et al., "An Overview of Limited Feedback in Wireless Communication Systems," IEEE J. on Selected Areas in Communications, vo. 26, No. 8, Oct. 2008.

Perahia, et al., "Gigabit Wireless LANs: an overview of IEEE 802.11ac and 80211ad," ACM SIGMOBILE Mobile Computing and Communications Review, vo. 15, No. 3, pp. 23-33, Jul. 2011.

S. A. Mujtaba, "IEEE P802.11—Wireless LANs, TGn Sync Proposal Technical Specification," *The Institute of Electrical and Electronics Engineers, Inc.*, doc.: IEEE 802.11-04/0889r6, May 2005.

Stacey et al., "IEEE P802.11, Wireless LANs, Proposed TGac Draft Amendment," Institute of Electrical and Electronics Engineers, doc. No. IEEE 802.11-10/1361r3 (Jan. 2011).

Stacey et al., "Specification Framework for TGac," document No. IEEE 802.11-09/0992r20, *Institute for Electrical and Electronics Engineers*, pp. 1-49 (Jan. 18, 2011).

(56) References Cited

OTHER PUBLICATIONS van Nee, et al. "The 802.11n MIMO-OFDM Standard for Wireless LAN and Beyond," *Wireless Personal Communications*, vol. 37, pp. 445-453 (Jun. 2006).

Vermani, et al. "Spec Framework Text for PHY Numerology," *The Institute of Electrical and Electronics Engineers*, doc. No. IEEE 802.11-11/1311r0, (Sep. 2011).

Zhang et al., "11ac Explicit Sounding and Feedback", *The Institute of Electrical and Electronics Engineers*, doc. No. IEEE 802.11-10/1105r0, (Sep. 2010).

U.S. Appl. No. 13/205,257, Hongyuan Zhang, entitled "Sub-Band Feedback for Beamforming on Downlink Multiple User MIMO Configurations", filed on Aug. 8, 2011.

U.S. Appl. No. 13/161,209, Sudhir Srinivasa et al., "Alternative Feedback Types for Downlink Multiple User MIMO Configurations", filed on Jun. 15, 2011.

U.S. Appl. No. 13/207,003, Sudhir Srinivasa et al., "Channel Description Feedback in a Communication System", filed on Aug. 10, 2011.

Partial International Search report for International Application No. PCT/US2011/054725, dated Feb. 14, 2012.

International Search Report and Written Opinion for International Application No. PCT/US2011/054725, dated Jun. 14, 2012.

International Preliminary Report on Patentability and Written Opinion for International Application No. PCT/US2011/054725, dated Apr. 9, 2013.

First Office Action in Chinese Application No. 201180056197.5, dated Mar. 26, 2015, with English translation (12 pages).

Notice of Reasons for Rejection in Japanese Patent Application No. 2013-531962, dated Sep. 8, 2015, with English translation (6 pages).

Erceg et al., "Text Proposal for LB84 Comment Resolution Related to the SNR Definition," *Institute of Electrical and Electronics Engineers*, IEEE 802.11-06/16841, 3 pages (Nov. 8, 2006).

\* cited by examiner

FIG. 2

| Order | Information |
|---|---|
| 1 | Category (e.g., =VHT) — 202 |
| 2 | Action (e.g., =Compressed Beamforming) — 204 |
| 3 | VHT MIMO Control — 206 |
| 4 | Compressed Beamforming Report — 208 |

200

COMPRESSED FEEDBACK FORMAT FOR WLAN

CROSS-REFERENCES TO RELATED APPLICATIONS

The present application is a continuation of U.S. patent application Ser. No. 13/252,710, (now U.S. Pat. No. 8,731, 090), entitled "Compressed Feedback Format for WLAN," and filed on Oct. 4, 2011, which claims the benefit of U.S. Provisional Patent Application No. 61/389,635, filed on Oct. 4, 2010. Both of the applications referenced above are hereby incorporated by reference in their entireties.

FIELD OF THE DISCLOSURE

The present disclosure relates generally to communication networks and, more particularly, to frame format for compressed feedback for beamforming applications.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Development of wireless local area network (WLAN) standards such as the Institute for Electrical and Electronics Engineers (IEEE) 802.11a, 802.11b, 802.11g, and 802.11n Standards, has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, and the IEEE 802.11n Standard specifies a single-user peak throughput of 600 Mbps. Work has begun on a new standard, IEEE 802.11ac, that promises to provide even greater throughput.

SUMMARY

In one embodiment, a method for transmitting channel feedback data from a receiver to a transmitter includes determining channel data for a plurality of orthogonal frequency division multiplexing (OFDM) tones for one or more spatial or space-time streams corresponding to the communication channel. The method also includes determining a compressed form of the channel data including determining a plurality of angle values associated with with i) the one or more spatial streams or space-time and ii) one or more OFDM tones of the plurality of OFDM tones. The method further includes, for each of the one or more spatial or space-time streams, i) determining a per-tone signal to noise ratio (PT-SNR) associated with one or more OFDM tones of the plurality of OFDM tones, and ii) determining an average signal to noise ratio (avg-SNR) by averaging signal to noise ratio (SNR) values associated with one or more OFDM tones of the plurality of OFDM tones. The method further yet includes generating a feedback report to include at least i) the plurality of angle values associated with the one or more spatial or space-time streams and the one or more OFDM tones, ii) the PT-SNRs corresponding to the one or more spatial or space-time streams and the one or more OFDM tones, and iii) the avg-SNR corresponding to the one or more spatial or space-time streams. The method further still includes including the feedback report in a data unit to be transmitted from the receiver to the transmitter.

In another embodiment, an apparatus includes a network interface configured to determine channel data for a plurality of orthogonal frequency division multiplexing (OFDM) tones for each of one or more spatial or space-time streams corresponding to the communication channel. The network interface is also configured to determine a compressed form of the channel data including determining a plurality of angle values associated with with i) the one or more spatial streams or space-time and ii) one or more OFDM tones of the plurality of OFDM tones. The network interface is further configured to, for each of the one or more spatial or space-time streams, i) determine a per-tone signal to noise ratio (PT-SNR) associated with one or more OFDM tones of the plurality of OFDM tones, and ii) determine an average signal to noise ratio (avg-SNR) associated with one or more OFDM tone of the plurality of OFDM tones. The network interface is further yet configured to generate a feedback report to include at least i) the plurality of angle values corresponding to the one or more spatial or space-time streams and the one or more OFDM tones, ii) the PT-SNRs corresponding to the one or more spatial or space-time streams and the one or more OFDM tones, and iii) the avg-SNR corresponding to the one or more spatial or space-time streams. The network interface is further still configured to include the feedback report in a data unit to be transmitted for the receiver to the transmitter.

BRIEF DESCRIPTION OF THE DRAWINGS

FIG. 2 is a diagram illustration an example feedback MAC protocol data unit (MPDU) format, according to an embodiment.

DETAILED DESCRIPTION

In embodiments described below, a wireless network device such as an access point (AP) of a wireless local area network (WLAN) transmits data streams to one or more client stations. In some embodiments, WLAN supports multiple input multiple output (MIMO) communication in which the AP and/or the client stations include more than one antenna, thereby creating a plurality of spatial (or space-time) streams over which data can be transmitted simultaneously. In an embodiment in which the AP employs multiple antennas for transmission, the AP utilizes various antennas to transmit the same signal while phasing (and amplifying) this signal as it is provided to the various transmit antennas to achieve beamforming or beamsteering. In order to implement a beamforming technique, the AP generally requires knowledge of certain characteristics of the communication channel between the AP and the one or more client stations for which a beamforming pattern is to be created. To obtain channel characteristics, according to one embodiment, the AP transmits to a client station a sounding packet including a number of training fields that allow the client station to accurately estimate the MIMO channel. The client station then transmits or feeds back, in some form, the obtained channel characteristics to the AP, for example by including channel characteristic information in a management or a control frame transmitted to the AP. Upon receiving, from one or more of the client stations, information characterizing the corresponding communication channels, the AP is able to generate desired beam patterns to be used in subsequent transmissions to one or more stations.

Figure 1:
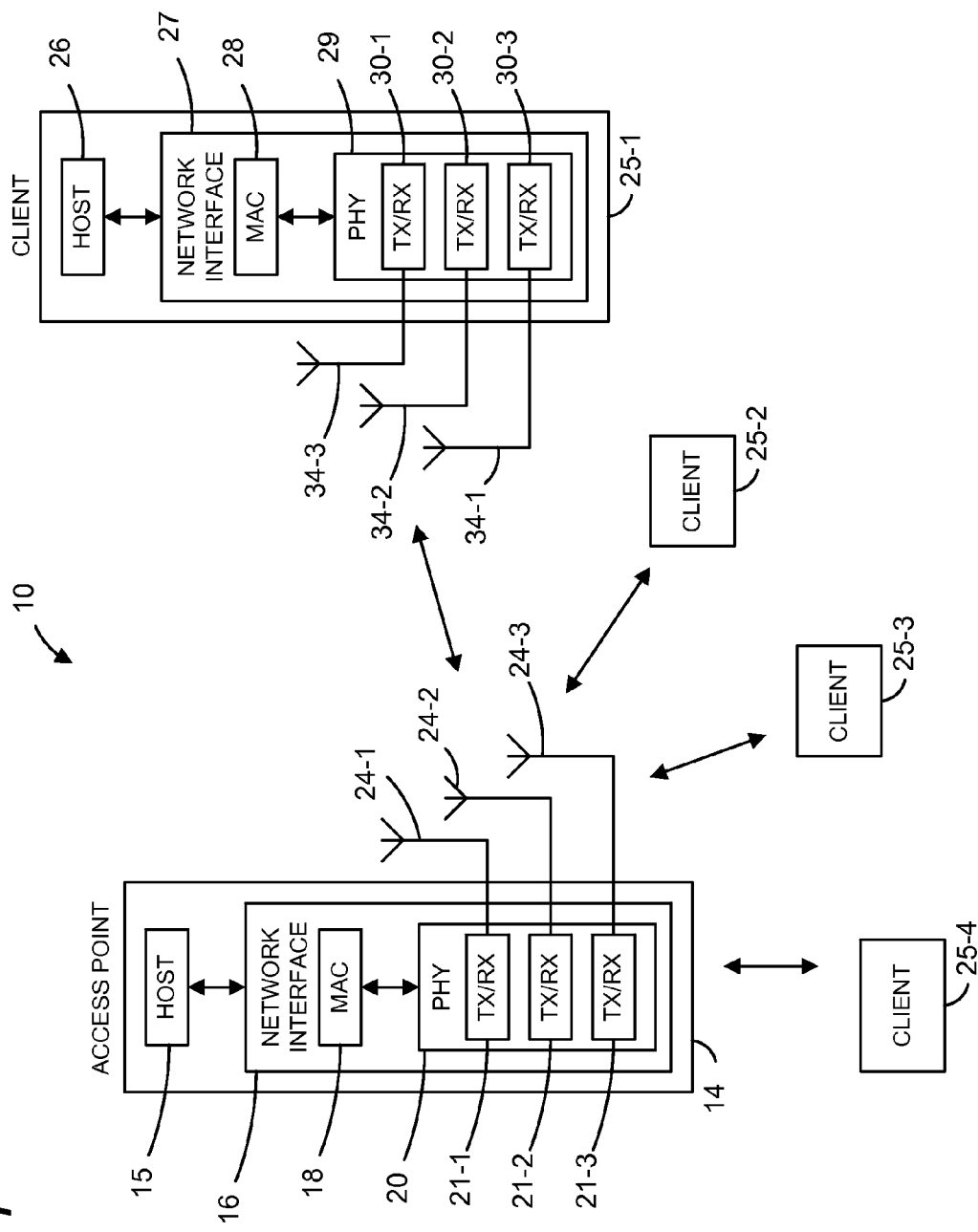
FIG. 1 is a block diagram of an example wireless communication network in which channel data feedback is utilized, according to an embodiment.

FIG. 1 is a block diagram of an example wireless local area network (WLAN) 10 in which channel data feedback is utilized, according to an embodiment. The WLAN 10 supports downlink (DL) multiuser (MU) multiple-input and multiple-output (MIMO) communication between an AP 14 and a plurality of client stations 25-i. Additionally, the WLAN 10 supports DL single-user (SU) communication between the AP 14 and each of the client stations 25-i. The AP 14 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 can include different numbers (e.g., 1, 2, 4, 5, etc.) of transceivers 21 and antennas 24 in other embodiments. In an embodiment, if the AP 14 performs beamforming or beam steering, and/or if the AP 14 operates in multiuser mode, the AP 14 includes at least two antennas 24. The WLAN 10 includes a plurality of client stations 25. Although four client stations 25 are illustrated in FIG. 1, the WLAN 10 can include different numbers (e.g., 1, 2, 3, 5, 6, etc.) of client stations 25 in various scenarios and embodiments. At least one of the client stations 25 (e.g., client station 25-1) is configured to operate at least according to the first communication protocol.

The client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 can include different numbers (e.g., 1, 2, 4, 5, etc.) of transceivers 30 and antennas 34 in other embodiments. In an embodiment, if the client station 25-1 performs beamforming or beam steering, the client station 25-1 includes at least two antennas 34.

In an embodiment, one or all of the client stations 25-2, 25-3 and 25-4 has a structure the same as or similar to the client station 25-1. In these embodiments, the client stations 25 structured the same as or similar to the client station 25-1 have the same or a different number of transceivers and antennas. For example, the client station 25-2 has only two transceivers and two antennas, according to an embodiment.

In various embodiments, the PHY processing unit 20 of the AP 14 is configured to generate data units conforming to the first communication protocol. The transceiver(s) 21 is/are configured to transmit the generated data units via the antenna(s) 24. Similarly, the transceiver(s) 24 is/are configured to receive the data units via the antenna(s) 24. The PHY processing unit 20 of the AP 14 is configured to process received data units conforming to the first communication protocol, according to an embodiment.

In various embodiments, the PHY processing unit 29 of the client device 25-1 is configured to generate data units conforming to the first communication protocol. The transceiver(s) 30 is/are configured to transmit the generated data units via the antenna(s) 34. Similarly, the transceiver(s) 30 is/are configured to receive data units via the antenna(s) 34. The PHY processing unit 29 of the client device 25-1 is configured to process received data units conforming to the first communication protocol, according to an embodiment.

With continued reference to FIG. 1, according to one embodiment, a client station, such as the client station 25-1, acquires in some manner (e.g., by receiving a sounding frame from the AP 14) characteristics of the channel between the AP 14 and the client station and feeds this information back to the AP 14. Generally, such feedback information takes on one of a variety of forms in various embodiments and/or scenarios. According to one embodiment, for example, channel information is sent in a compressed form (the compressed form is sometimes also referred to as compressed beamforming feedback, or compressed V feedback). In this embodiment, feedback information comprises a set of angles characterizing the channel. In an embodiment, feedback information is the transmitted from a beamformee (e.g., client station 25-1) to a beamformer (e.g., AP 14) to allow the beamformer to steer subsequent transmissions in the direction of the beamformee. Compressed feedback configuration, in accordance with some embodiments of the present disclosure, is described in U.S. patent application Ser. No. 13/161,209, entitled "Alternative Feedback Types For Downlink Multiple User MIMO Configurations", filed on Jun. 15, 2011, which is hereby incorporated by reference herein in its entirety.

In one embodiment, in a single user case, the client station 25-1 is the beamformee, or the device to which beamforming is directed, and the AP 14 is the beamformer, or the device performing beamforming or beamsteering. In another embodiment, in a multiuser case, the AP 14 performs beamforming simultaneously to a plurality of client stations 25. In this embodiment, each client station 25 to which beamforming is directed is a beamformee, and the AP 14 is the beamformer. In yet another embodiment, the AP 14 is the beamformee and the client station 25-1 is the beamformer.

FIG. 2 is a diagram illustration an example feedback MAC protocol data unit (MPDU) 200, according to an embodiment. With reference to FIG. 1, in an embodiment, the client station 25-1 transmits the MPDU 200 to the AP 14 in order to communicate compressed beamforming channel information to the AP 14. The MPDU 200 includes a category field 202 to indicate the particular communication protocol being utilized. For example, in one embodiment, the category field indicates that the VHT protocol is being utilized. The MPDU 200 also includes an action field 204 to indicate the type, or the format, of the channel feedback information included in the frame (e.g., compressed beamforming). The MPDU 200 further includes a VHT MIMO control field 206 and a compressed beamforming report field 208, each of which is described in more detail below.

Figure 3:
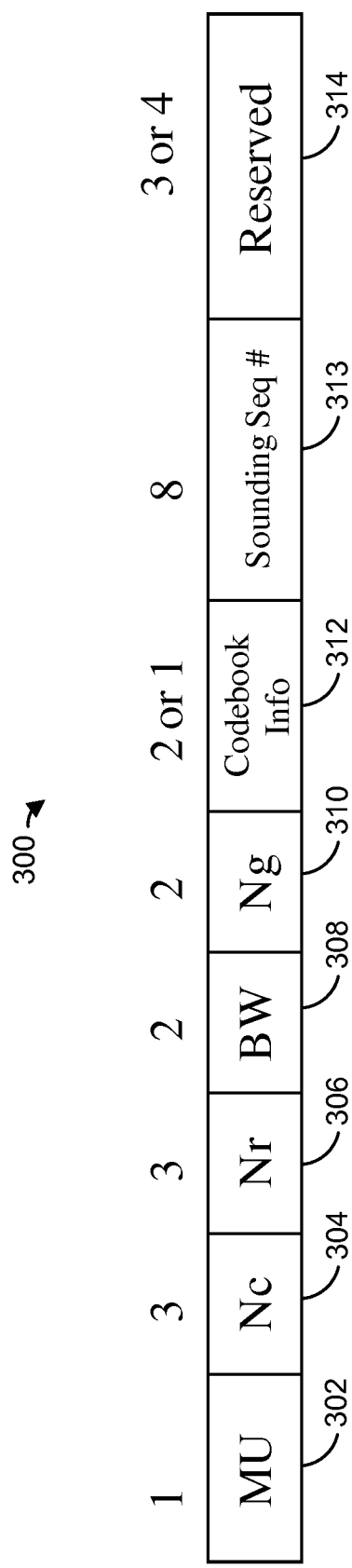
FIG. 3 is a diagram illustrating a control field, according to one embodiment.

FIG. 3 is a diagram illustrating a control field 300, such as the VHT MIMO control field 206 of the MPDU 200 (FIG. 2), according to an embodiment. In one embodiment, the MPDU 200 includes the control field 300 when WLAN 10 operates in a single user mode, i.e., when the AP 14 transmits to only one of the client stations 25-i at a time. In another embodiment, the MPDU 200 includes the control field 300 when WLAN 10 operates in a multiuser mode, i.e., when the AP 14 transmits (and beamforms) to more than one of the client stations 25-i simultaneously. The control field 300 includes certain elements, or subfields, common to both modes, while certain other elements or subfields are different for the two modes.

The control field 300 includes an MU subfield 302 to indicate whether a single user or a multiuser mode is being utilized ("a mode indicator"). In an example embodiment, the MU subfield 302 is set to a logic "0" to indicate single user feedback (SU FB), and is set to a logic "1" to indicate multiuser feedback "MU FB." Alternatively, in another embodiment, a logic "0" indicates MU FB and a logic "1" indicates SU FB.

The control field 300 also includes an Nc subfield 304 and an Nr subfield 306 to indicate a number or columns and a number of rows, respectively, in a steering matrix corresponding to the feedback communication channel (i.e., the communication channel between the beamformer and the beamformee). More specifically, in an embodiment, a steering matrix has dimensions corresponding to (number of transmit antennas)×(number of spatial (or space-time) streams) forming a steering matrix suitable for the communication channel to which the channel feedback corresponds. Accordingly, in this embodiment, the Nc subfield 304 indicates the number of spatial streams (or space-time streams if space-time encoding is utilized) corresponding to the communication channel, and the Nr subfield 306 indicates the number of transmit antennas used at the beamformee for steering transmissions to the beamformee. In an embodiment, the particular number of spatial/space-time streams to which the steering matrix corresponds is determined at the beamformee. As an example, in an embodiment, a maximum of eight transmit antennas and a maximum of eight receive antennas are utilized, forming a maximum of eight spatial/space-time streams. In this embodiment, depending on the particular channel configuration to which the feedback corresponds, the Nc subfield 304 and the Nr subfield 306 each contains a value in the range of 0 to 7 to indicate a corresponding number of spatial/space-time streams and a corresponding number of transmit antennas, respectively. In other embodiments, other suitable channel configurations are supported, and, accordingly, the Nc subfield 304 and/or the Nr subfield 306 contain other suitable values in at least some situations.

The control field 300 also includes BW subfield 308 to indicate the channel bandwidth to which the feedback data corresponds. In one embodiment, the bandwidth subfield 308 includes two bits that are set to the value of 0 to indicate a 20 MHz BW, the value of 1 to indicate a 40 MHz BW, the value of 2 indicate an 80 MHz, and the value of 3 to indicate a 160 MHz BW. In other embodiments, the BW subfield 308 includes other suitable number of bits and/or is used to indicate other suitable bandwidths. The control field 300 also includes Ng subfield 310 to indicate a tone grouping used to transmit the channel feedback, as described in more detail below.

The codebook info subfield 312 indicates the number of bits used to quantize and/or encode the angles corresponding to the compressed feedback. In an embodiment, a codebook is composed of entries of from (x, y), where the x value corresponds to the number of bits used to quantize the $\phi$ angle value, and the y value corresponds to the number of bits used to quantize the $\psi$ angle value. In an embodiment, the specific codebook information depends on whether the SU or the MU mode is being utilized. Accordingly, in this embodiment, the value of the subfield 312 is interpreted differently for the two modes. In one embodiment, the subfield 312 includes one bit allowing indication of one of two suitable codebook entries. In an example embodiment utilizing two bits, a logic "0" indicates (2, 4) quantizing bits in SU mode (e.g., indicated by a value of 0 in MU subfield 302), and (6, 8) quantizing bits in MU mode ((e.g., indicated by a value of 1 in MU subfield 302). Similarly, in an embodiment, a logic "1" in subfield 312 indicates (4, 6) quantizing bits in SU mode and (7, 9) quantizing bits in MU mode. Alternatively, in another embodiment, the codebook info subfield 312 includes two bits allowing indication of one of four suitable codebook entries, which are interpreted differently for the SU and the MU modes. In one such embodiment, for example, if SU mode is indicated (e.g., in the MU subfield 302), a value of 0 is the codebook info subfield 312 corresponds to a codebook entry of (1, 3), a value of 1 corresponds to a codebook entry of (2, 4), a value of 2 corresponds to a codebook entry of (3, 5), and a value of 2 corresponds to (4, 6). On the other hand, if MU mode is indicated, in this example embodiment, a value of 0 is the codebook info subfield 312 corresponds to a codebook entry of (4, 6), a value of 1 corresponds to a codebook entry of (5, 7), a value of 2 corresponds to a codebook entry of (6, 8), and a value of 2 corresponds to (7, 9).

Additionally, the control field 300 includes a sounding sequence number subfield 314 and a reserved subfield 316. In one embodiment, the reserved subfield 316 includes a number of bits needed to extend the control field 300 to entirely cover 3 bytes. In another embodiment, the reserved subfield 316 includes a number of bits needed to extend the control field 300 to entirely cover 4 bytes. In other embodiments, the reserved subfield 314 includes another suitable number of bits. Further, in an embodiment in which tone augmentation is used (e.g., in MU mode), one or more bits in the reserved subfield 316 are used to indicate tone augmentation (e.g., one bit is used to indicate is tone augmentation is being utilized).

A feedback report field follows the control field and includes channel information corresponding to the communication channel between the beamformer and the beamformee. In some embodiments, such as embodiments utilizing multiple input, multiple output (MIMO) channels and/or orthogonal frequency division multiplexing (OFDM), the amount of channel data fully characterizing the communication channel ("a full channel estimate") is large. In embodiments utilizing multiple transmit and receive antennas (i.e., MIMO channels), for example, a full channel estimate includes estimates of the sub-channels corresponding to each transmit and receive antenna pair. Further, in embodiments utilizing orthogonal frequency division multiplexing (OFDM), a full channel estimate includes channel estimates at each of the subcarrier frequencies. Therefore, to reduce the amount of channel estimate data transmitted from a beamformee (e.g., client station 25-1) to a beamformer (e.g., AP 14) in some embodiments, the beamformee transmits only a subset of the full channel estimate data. For example, in some embodiments utilizing OFDM-based communication, a technique of subcarrier grouping is utilized in which the OFDM subcarriers are combined into groups, and channel estimate data corresponding to only one subcarrier in each group is transmitted back to the AP. Additionally or alternatively, in some embodiments utilizing a subcarrier grouping technique, an average of channel estimate data corresponding to the subcarriers in a group of subcarriers is transmitted back to the AP.

For example, in an embodiment, if the feedback channel data corresponds to a 20 MHz channel (with 52 OFDM data/pilot tones), feedback report includes channel data for all 52 tones if a tone grouping of 1 tone (i.e., no grouping) is being utilized, channel data for 30 OFDM tones if a tone grouping of 2 tones is being utilized, and channel data for 16 OFDM tones if a tone grouping of 4 is being utilized. In a 40 MHz channel case (with 108 OFDM data/pilot tones), according to an embodiment, feedback report includes channel data for all 108 tones if a tone grouping of 1 tone (i.e., no grouping) is being utilized, channel data for 58 OFDM tones if a tone grouping of 2 tones is being utilized, and channel data for 30 OFDM tones if a tone grouping on 4 is being utilized. Similarly, in an 80 MHz channel case (with 234 OFDM data/pilot tones), according to an embodiment, feedback report includes channel data for all 234 tones if a tone grouping of 1 tone (i.e., no grouping) is being utilized, channel data for 122 OFDM tones if a tone grouping of 2 tones is being utilized, and channel data for 62 OFDM tones if a tone grouping of 4 is being utilized. In an embodiment in which feedback report includes channel data for a 160 MHz channel, the feedback report includes channel data corresponding to 80 MHz subbands, with the corresponding 80 MHz channel tone groupings described above. A more detailed description of various tone groupings and some specific examples of feedback tones, according to some embodiments of the present disclosure, is found in U.S. patent application Ser. No. 13/207,003, entitled "Channel Description Feedback in a Communication System", filed on Aug. 10, 2011, which is hereby incorporated by reference herein in its entirety. In an embodiment, the particular subcarrier grouping being utilized is indicated in the Ng subfield 310 of the control field 300 (FIG. 3).

In some embodiments, a 40 MHz, an 80 MHz or a 160 MHz channel is formed of a primary 20 MHz channel and a number of subband extension channels, the particular number or subband channels depending on the bandwidth being utilized. In some such embodiments, a feedback report for a 40 MHz, a 80 MHz, or a 160 Mhz channel includes data corresponding to only a portion of the entire channel. For example, a feedback report for a 40 MHz channel, includes feedback data for a 20 MHz subchannel, according to an embodiment. Similarly, a feedback report for a 80 MHz channel includes feedback data for a 20 MHz subchannel, in an embodiment. In another embodiment, a feedback report for a 80 MHz channel includes feedback data for a 40 MHz subchannel. In some such embodiments, the beamformer, upon receiving the feedback data, interprets the feedback as corresponding to the primary 20 MHz channel. Further, if the feedback data corresponds to a larger bandwidths the 20 MHz primary channel, such as a 40 MHz BW or an 80 MHz BW, the beamformer interprets the feedback data as corresponding to a channel subband containing the primary 20 MHz channel. Primary and extension subband channels, in accordance with some embodiments of the present disclosure, are described in U.S. patent application Ser. No. 13/205,257, entitled "Sub-Band Feedback For Beamforming on Downlink Multiple User MIMO Configurations", filed on Aug. 8, 2011, which is hereby incorporated by reference herein in its entirety.

Figure 4A:
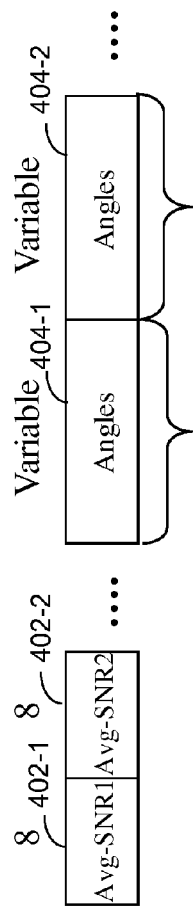
FIGS. 4A-4C are diagrams illustrating various feedback (FB) report field formats, in various embodiments and/or scenarios.
Figure 4B:
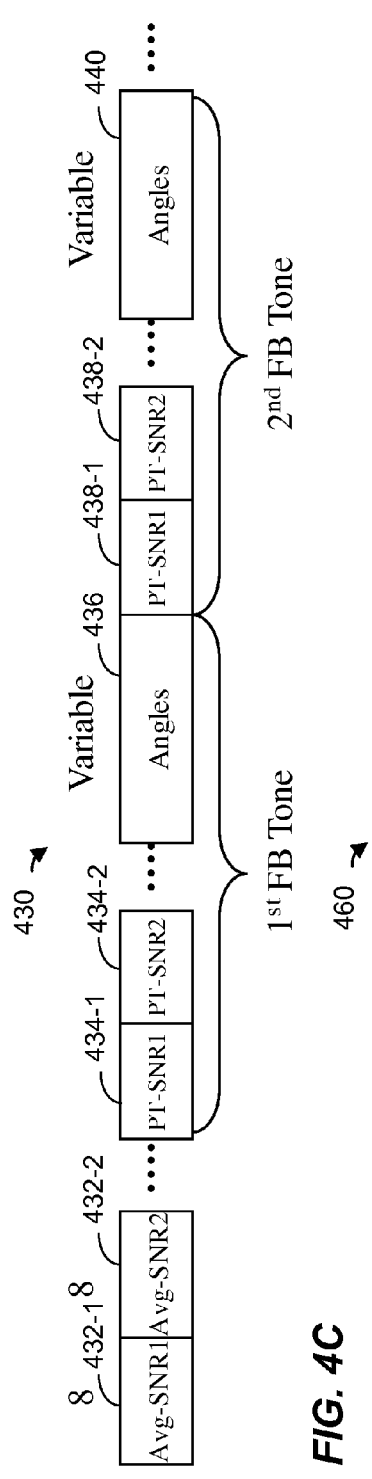
Figure 4C:
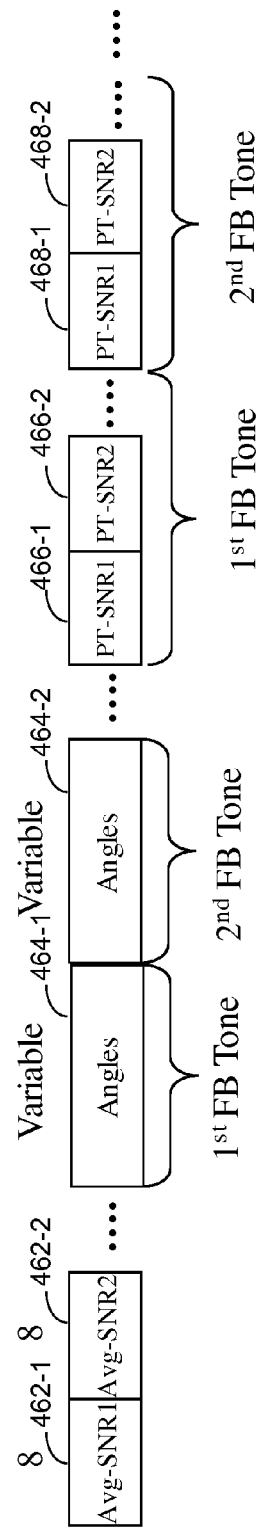

FIGS. 4A-4C are diagrams illustrating various feedback (FB) report field formats included in the MPDU 200 (e.g., compressed beamforming report field 208 in FIG. 2) for SU and/or MU modes, in various embodiments and/or scenarios. Referring to FIG. 4A, in an embodiment, FB report field 400 is used for a single user case. The FB report field 400 includes a plurality of Avg-SNR subfields 402 which include signal to noise (SNR) values averaged over a plurality of OFDM tones for a plurality of spatial/space-time streams. Accordingly, in an embodiment, the number of Avg-SNR subfields 402 corresponds to the number of spatial/space-time streams included in the feedback (i.e., the number spatial/space-time streams for which channel information is fed back). The FB report field 400 also includes a plurality of angle subfields 404 which include the quantized angle values as indicated, for example, in the codebook information subfield 312 of the control field 300 (FIG. 3). In other words, the number of angle subfields 404 generally corresponds to the number of spatial/space-time streams, and each angle subfield 404 includes quantized angle values for a number of OFDM tones (corresponding to feedback tones) associated with a particular spatial/space-time stream. For convenience, FIG. 4A explicitly shows subfields associated with only two OFDM feedback tones. However, in various embodiments and/or scenarios, the FB report field 400 includes angle data for any suitable number of OFDM feedback tones.

Referring now to FIG. 4B, the FB report field 430 is used in a multiuser case, according to an embodiment. The FB report field is similar to FB report filed 400, except that the FB report filed 430 also includes a plurality of "per-tone" signal to noise (PT-SNR) subfields generally illustrated in FIG. 4B at blocks 434 and blocks 438. That is, in the embodiment illustrated in FIG. 4B, in a multiuser case, the FB report field includes a PT SNR value for to each feedback tone, in addition to the average SNR over a plurality of OFDM tones. More specifically, in an embodiment, PT-SNR subfields 434 include SNR values associated with a first OFDM feedback tone for each of the spatial/space-time stream included in the feedback. Similarly, PT-SNR subfields 438 include SNR values associated with a second OFDM feedback tone for each of the spatial/space-time stream included in the feedback. For convenience, FIG. 4B explicitly shows subfields associated with only two OFDM feedback tones. However, in various embodiments and/or scenarios, the FB report field 430 includes angle data and per-tone SNR data for any suitable number of OFDM feedback tones.

FIG. 4C illustrates another FB feedback report 460 which includes per-tone SNR values, according to another embodiment. The FB feedback report 460 is used in a multiuser case, according to an embodiment. The FB feedback report field 460 is similar to the FB report field 430, except that in the FB report field 460, a plurality of PT-SNR subfields 466, a plurality of PT-SNR subfields 468, etc. are included after the angle subfields 464. In general, PT-SNR subfields are included at any suitable locations within an FB report field, in various embodiments and/or scenarios.

In the embodiments described above, per-tone SNR values are included in a multiuser mode, while only the avg-SNR values are included in a single user mode. In these embodiments, average SNRs provide sufficient information to effectively perform beamforming in a single user case, while additional (per-tone) SNR data is beneficial to for a multiuser case. In some embodiments, however, a FB report field includes per-tone SNR values, in addition to the avg-SNR values, for a single user case as well as for a multiuser case.

In an embodiment, the average SNR values (e.g., included in the avg-SNR subfields 402, the avg-SNR subfields 432, and/or the avg-SNR subfields 462) are quantized using an eight bit two's compliment integer of $4\times(SNR_{AVG\_i}-22)$, wherein $SNR_{AVG\_i}$ is the average SNR corresponding to the $i^{th}$ spatial/space-time stream. In this embodiment, a quantized avg-SNR value for each spatial/space-time stream is within the range of −10 dB to 53.75 dB, in 0.25 dB steps. Similarly, in an embodiment, each of the PT-SNR values (e.g., included in the PT-SNR subfields 434, the PT-SNR subfields 438, the PT-SNR subfields 466, and/or the PT-SNR subfields 468) is quantized to eight bits using an eight bit two's compliment integer of $4\times(SNR_i-22)$, wherein $SNR_i$ is the SNR corresponding to the respective OFDM tone for the $i^{th}$ spatial/space-time stream. In another embodiment, each of the PT-SNR values is quantized to four bits using a four bit two's compliment integer of $(SNR_i-22)$, wherein $SNR_i$ is the SNR corresponding to the respective OFDM tone for the $i^{th}$ spatial/space-time stream. In this case, the quantized PT-SNRs are in the range of −10 dB to 50 dB in 4 dB steps.

Alternatively, in some embodiments, a delta between per-tone SNR and the average SNR for a group of tones for the corresponding spatial/space-time stream is quantized and the quantized delta value is included in a corresponding PT-SNR subfield. For example, in one such embodiment, the quantized delta corresponds to a four bit two's complement integer of $(SNR_i - SNR_{AVG\_i})/2$, wherein $SNR_i$ is the SNR corresponding to the respective OFDM tone for the $i^{th}$ spatial/space-time stream, and $SNR_{AVG\_i}$ is the average SNR for the corresponding spatial/space-time stream. In this embodiment, the quantized per-tone SNR delta is in the range of −16 dB to 14 dB, in 2 dB steps. As another example, in another embodiment, the quantized delta corresponds to a four bit two's complement integer of $(SNR_i - SNR_{AVG\_i})$, wherein $SNR_i$ is the SNR corresponding to the respective OFDM tone for the $i^{th}$ spatial/space-time stream, and $SNR_{AVG\_i}$ is the average SNR for the corresponding spatial/space-time stream. In this embodiment, the per-tone SNR delta is in the range of −8 dB to 7 dB in 1 dB steps. Other suitable quantization techniques are used to generate quantized values representing per-tone SNR values in other embodiments.

Referring back to FIG. 2, in some embodiments, the MPDU 200 is included in a feedback Action-No-Action frame of action type +HTC (or a "+HTC frame"), which also includes feedback corresponding to a modulation and coding scheme (MCS) selected at the beamformee and sent back to the beamformer. In some such embodiments, the number of columns Nc (e.g., included in the Nc subfield 304 of FIG. 3) is the same as the number of spatial/space-time streams (Nss) corresponding to the feedback MCS.

According to an embodiment, when a beamformer (e.g., the AP 14) receives the feedback MPDU 200, in a single user case, the beamformer interprets the Nc value (e.g., indicated by the Nc subfield 304 of FIG. 3) as the best number of spatial/space-time streams recommended by the beamformee to be used for beamforming to the beamformee. On the other hand, in a multiuser case, when a beamformer (e.g., the AP 14) receives the feedback MPDU 200, the beamformer interprets the Nc value (e.g., indicated by the Nc subfield 304 of FIG. 3) as the maximum number of spatial/space-time streams to be used for beamforming in the direction of the beamformee. In this embodiment, the beamformer determines the actual number of spatial/space-time streams to be used for the beamformee based on feedback received from all of the users to which beamforming is to be simultaneously performed. In this embodiment, a beamsteering matrix for all of the users is jointly calculated, taking into account feedback information received from all of the corresponding users (to which the particular transmission is being steered).

Figure 5:
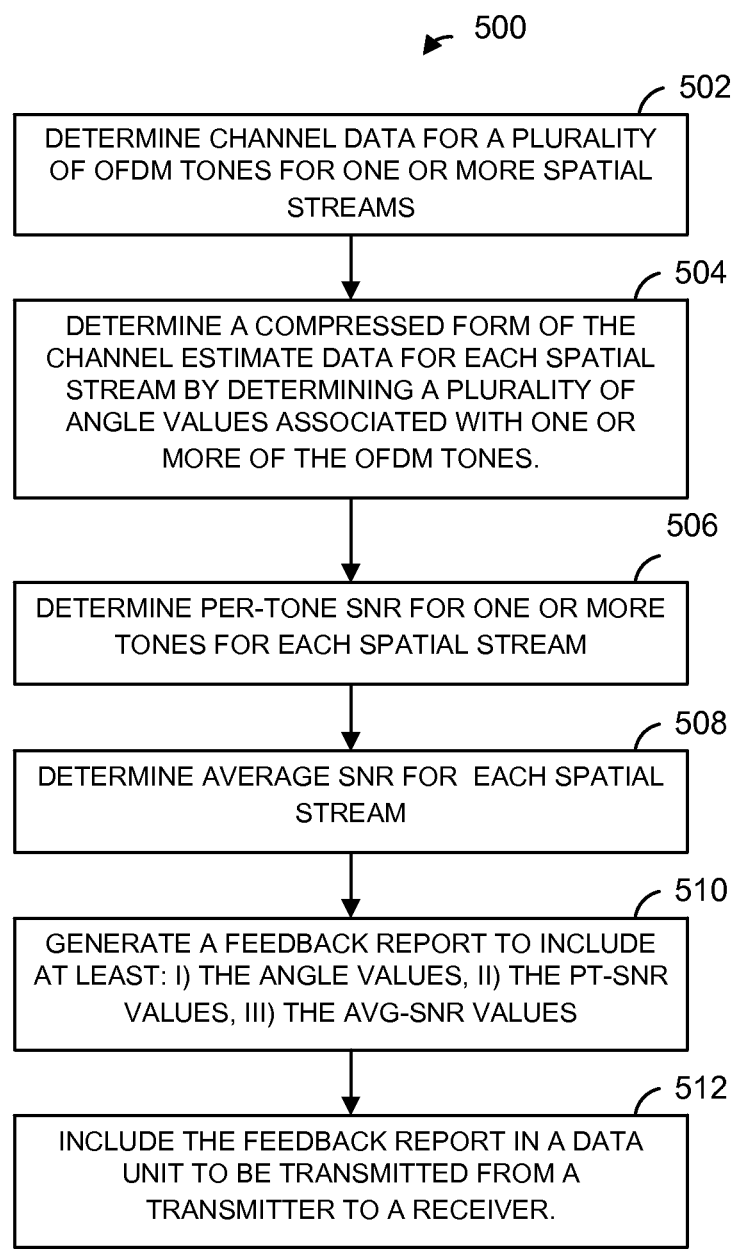
FIG. 5 is a flow diagram of an example method for transmitting channel estimate data from a receiver to a transmitter, according to an embodiment.

FIG. 5 is a flow diagram of an example method 500 for transmitting channel estimate data from a receiver to a transmitter, according to an embodiment. With reference to FIG. 1, the method 500 is implemented by the network interface 27 of the client station 25-1, in an embodiment. For example, in one such embodiment, the PHY processing unit 29 is configured to implement the method 500. According to another embodiment, the MAC processing 28 is also configured to implement at least a part of the method 500. With continued reference to FIG. 1, in yet another embodiment, the method 500 is implemented by the network interface 16 (e.g., the PHY processing unit 20 and/or the MAC processing unit 18). In other embodiments, the method 500 is implemented by other suitable network interfaces.

At block 502, channel data for a plurality of OFDM tones for one or more spatial/space-time streams corresponding to the communication channel (e.g., the channel between the AP 14 and the client station 25-1) is determined. In an embodiment, channel data is determined based on one or more training fields included in a sounding wave that the receiver receives from the transmitter. At block 504, a compressed form of the channel data determined at block 502 is generated. In an embodiment, generating compressed form of the channel data comprises generating a plurality of angels associated with the communication channel for a corresponding number of spatial/space-time streams and the plurality of OFDM tones. Referring to FIGS. 4A-4C, in one embodiment, the angle values determined at block 504 correspond to the values included in the angle subfields 404 of FIG. 4A, the angle subfields 436 and 440 of FIG. 4B, or the angle subfields 464 of FIG. 4C.

At block 506, per-tone SNR (PT-SNR) is generated for one or more of the plurality of OFDM tones. In an embodiment, the PT-SNR values determined at block 506 correspond to the PT-SNR subfields 434 and 438 of FIG. 4B, or the PT-SNR subfields 466 and 468 of FIG. 4C. At block 508, average SNR (avg-SNR) over a group of OFDM tones is determined for each spatial/space-time stream. In an embodiment, the avg-SNR values determined at block 506 correspond to the avg-SNR subfields 402 of FIG. 4A, the avg-SNR subfields 432 of FIG. 4B, or the avg-SNR subfields 462 of FIG. 4C are determined at block 508.

At block 510, a data unit is generated to include at least i) the plurality of angle values corresponding to the one or more spatial/space-time streams and the one or more OFDM tones, ii) the PT-SNRs corresponding to the one or more spatial/space-time streams and the one or more OFDM tones, and iii) the avg-SNR corresponding to the one or more spatial/space-time streams. In one embodiment, generating the data unit at block 510 includes quantizing the angle values using the number of bits indicated in the codebook information subfield 312 of FIG. 3. In an embodiment, generating the data unit at block 510 also includes quantizing the PT-SNR values and the avg-SNR values as discussed above. As also discussed above, in one embodiment, the PT-SNR values are omitted in a single user case (i.e., when the feedback report is to be used for steering to a single user).

At block 512, the feedback report generated at block 510 is included in a data unit to be transmitted from a receiver (a beamformee) to a transmitter (a beamformer).

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed:

1. A method comprising:
   transmitting, from a first communication device, a sounding packet using one or more spatial or space-time streams and modulated using orthogonal frequency division multiplexing (OFDM);
   receiving, at the first communication device, a feedback packet that was transmitted by a second communication device, the feedback packet including a feedback report corresponding to the sounding packet, the feedback report including
   i) a plurality of angle values associated with the one or more spatial or space-time streams and one or more OFDM tones corresponding to the sounding packet,
   ii) deltas corresponding to per-tone signal to noise ratio (PT-SNRs) associated with the one or more spatial or space-time streams and at least some of the one or more OFDM tones, wherein each delta corresponds to a difference between the respective PT-SNR and the an average signal to noise ratio (avg-SNR) associated with the one or more spatial or space-time streams, and
   iii) the avg-SNR associated with the one or more spatial or space-time streams; and
   using, at the first communication device, the feedback report to beamform transmissions to the second communication device.

2. The method of claim 1, wherein:
   the feedback report further includes an indication of a maximum number of spatial or space-time streams to use when transmitting to the second communication device; and
   the method further comprises determining, at the first communication device, a number of spatial or space-time streams to use when transmitting to the second communication device.

3. The method of claim 1, wherein:
   the sounding packet is a first sounding packet;
   the feedback packet is a first feedback packet;
   the feedback report is a first feedback report corresponding to a multiuser (MU) mode;
   the plurality of angle values is a plurality of first angle values;
   the one or more spatial or space-time streams are a first one or more spatial or space-time streams; and
   the method further comprises:
      transmitting, from the first communication device, a second sounding packet using a second one or more spatial or space-time streams and modulated using OFDM, the second sounding packet corresponding to a single user (SU) mode,
      receiving, at the first communication device, a second feedback packet that was transmitted by the second communication device, the second feedback packet including a second feedback report corresponding to the second sounding packet, the second feedback report including
      i) a plurality of second angle values associated with the second one or more spatial or space-time streams and one or more OFDM tones corresponding to the second sounding packet, and
      ii) an avg-SNR associated with the second one or more spatial or space-time streams, and
      using, at the first communication device, the second feedback report to beamform transmissions to the second communication device in the SU mode.

4. The method of claim 1, wherein the feedback packet includes:
   a mode indicator field that indicates that the feedback report corresponds to a multiuser (MU) mode.

5. The method of claim 1, further comprising:
   determining, at the first communication device, an actual number of spatial or space-time streams to use when transmitting to the second communication device in a multiuser (MU) mode based on other feedback packets received from one or more third communication devices.

6. The method of claim 1, further comprising:
   jointly calculating, at the first communication device, a beamsteering matrix to be used when transmitting to the second communication and one or more third communication devices in a multiuser (MU) mode using information in the feedback report and information in one or more other feedback reports received from the one or more third communication devices.

7. The method of claim 1, wherein the feedback packet further includes codebook information to indicate a number of bits used for quantizing each angle value of the plurality of angle values.

8. The method of claim 1, wherein the first communication device is an access point.

9. The method of claim 7, wherein the second communication device is a client of the access point.

10. The method of claim 1, wherein the feedback packet further includes a modulation and coding scheme (MCS) feedback indicator.

11. The method of claim 1, wherein the feedback report includes angle values and deltas corresponding to only one respective OFDM tone for multiple groups of OFDM tones.

12. A first communication device comprising:
    a network interface device having one or more integrated circuit devices configured to:
       cause the first communication device to transmit a sounding packet using one or more spatial or space-time streams and modulated using orthogonal frequency division multiplexing (OFDM),
       process a feedback packet, the feedback packet having been transmitted by a second communication device and received at the first communication device, the feedback packet including a feedback report corresponding to the sounding packet, the feedback report including
       i) a plurality of angle values associated with the one or more spatial or space-time streams and one or more OFDM tones corresponding to the sounding packet,
       ii) deltas corresponding to per-tone signal to noise ratio (PT-SNRs) associated with the one or more spatial or space-time streams and at least some of the one or more OFDM tones, wherein each delta corresponds to a difference between the respective PT-SNR and the an average signal to noise ratio (avg-SNR) associated with the one or more spatial or space-time streams, and iii) the avg-SNR associated with the one or more spatial or space-time streams, and use the feedback report to beamform transmissions to the second communication device.

13. The first communication device of claim 12, wherein:
the feedback report further includes an indication of a maximum number of spatial or space-time streams to use when transmitting to the second communication device; and
the one or more integrated circuit devices are further configured to determine a number of spatial or space-time streams to use when transmitting to the second communication device.

14. The first communication device of claim 12, wherein:
the sounding packet is a first sounding packet;
the feedback packet is a first feedback packet;
the feedback report is a first feedback report corresponding to a multiuser (MU) mode;
the plurality of angle values is a plurality of first angle values;
the one or more spatial or space-time streams are a first one or more spatial or space-time streams; and
the one or more integrated circuit devices are further configured to:
cause the first communication device to transmit a second sounding packet using a second one or more spatial or space-time streams and modulated using OFDM, the second sounding packet corresponding to a single user (SU) mode,
process a second feedback packet, the second feedback packet having been transmitted by the second communication device and received at the first communication device, the second feedback packet including a second feedback report corresponding to the second sounding packet, the second feedback report including
i) a plurality of second angle values associated with the second one or more spatial or space-time streams and one or more OFDM tones corresponding to the second sounding packet, and
ii) an avg-SNR associated with the second one or more spatial or space-time streams, and
use the second feedback report to beamform transmissions to the second communication device in the SU mode.

15. The first communication device of claim 12, wherein the feedback packet includes:
a mode indicator field that indicates that the feedback report corresponds to a multiuser (MU) mode.

16. The first communication device of claim 12, wherein the one or more integrated circuit devices are further configured to:
determine an actual number of spatial or space-time streams to use when transmitting to the second communication device in a multiuser (MU) mode based on other feedback packets received, at the first communication device, from one or more third communication devices.

17. The first communication device of claim 12, wherein the one or more integrated circuit devices are further configured to:
jointly calculate a beamsteering matrix to be used when transmitting to the second communication and one or more third communication devices in a multiuser (MU) mode using information in the feedback report and information in one or more other feedback reports received from the one or more third communication devices.

18. The first communication device of claim 12, wherein the feedback packet further includes codebook information to indicate a number of bits used for quantizing each angle value of the plurality of angle values.

19. The first communication device of claim 12, wherein the first communication device is an access point.

20. The first communication device of claim 19, wherein the second communication device is a client of the access point.

21. The first communication device of claim 12, wherein the feedback packet further includes a modulation and coding scheme (MCS) feedback indicator.

22. A tangible, non-transitory computer readable medium having stored thereon computer executable instructions that, when executed by a processor, cause the processor to:
cause a first communication device to transmit a sounding packet using one or more spatial or space-time streams and modulated using orthogonal frequency division multiplexing (OFDM),
process a feedback packet, the feedback packet having been transmitted by a second communication device and received at the first communication device, the feedback packet including a feedback report corresponding to the sounding packet, the feedback report including
i) a plurality of angle values associated with the one or more spatial or space-time streams and one or more OFDM tones corresponding to the sounding packet,
ii) deltas corresponding to per-tone signal to noise ratio (PT-SNRs) associated with the one or more spatial or space-time streams and at least some of the one or more OFDM tones, wherein each delta corresponds to a difference between the respective PT-SNR and the an average signal to noise ratio (avg-SNR) associated with the one or more spatial or space-time streams, and
iii) the avg-SNR associated with the one or more spatial or space-time streams, and
use the feedback report to beamform transmissions to the second communication device.

* * * * *